T. J. MAYALL.

Flower-Pot.

No. { 2,201, 33,205. }

Patented Sept 3. 1861

Witnesses.

Inventor.

UNITED STATES PATENT OFFICE.

THOMAS J. MAYALL, OF ROXBURY, MASSACHUSETTS.

IMPROVEMENT IN FLOWER-POTS.

Specification forming part of Letters Patent No. 33,205, dated September 3, 1861.

*To all whom it may concern:*

Be it known that I, THOMAS J. MAYALL, of Roxbury, in the county of Norfolk and State of Massachusetts, have invented certain new and useful Improvements in the Manufacture of Flower-Pots, and I do hereby declare that the following description, taken in connection with the accompanying drawings, hereinafter referred to, forms a full and exact specification of the same, wherein I have set forth the nature and principles of my improvements by which my invention may be distinguised from all others of a similar class, together with such parts as I claim and desire to have secured to me by Letters Patent.

The figures of the accompanying plate of drawings represent my improvements.

Figure 1:
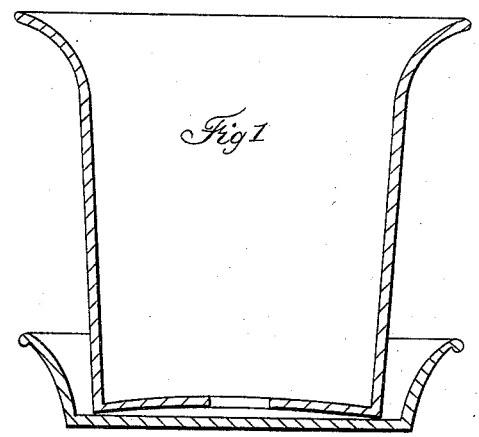
Figure 2:
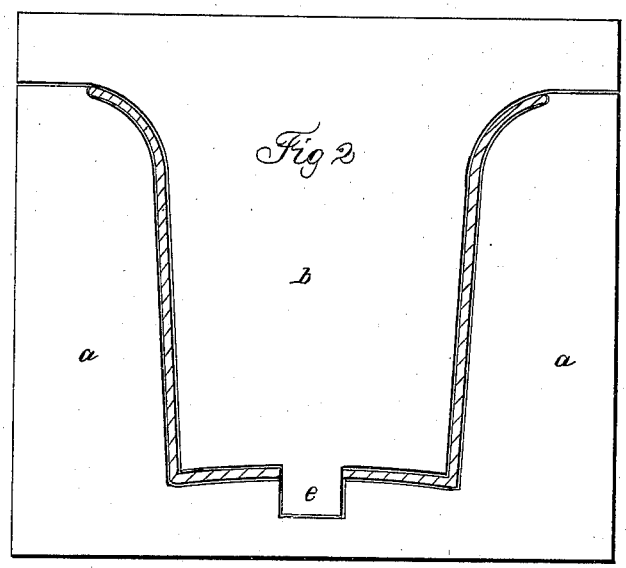
Figure 3:
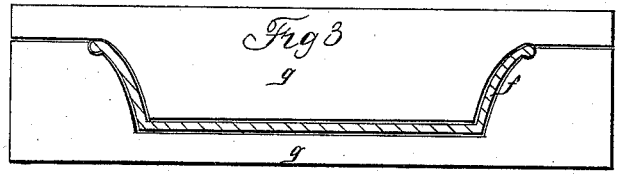

Figure 1 is a central vertical section of the flower-pot and its bottom dish. Fig. 2 is a similar view, showing the flower-pot in its molds. Fig. 3 is a view showing the manner of molding the bottom dish.

The present invention consists in a new method of making flower-pots so that they can not be broken by ordinary use or by being dropped, being made of rubber or gutta-percha, or of a composition of either with other substances.

The mode of making the flower-pot I will now described in detail. I make a composition of about the following proportions—viz., twelve pounds of rubber trimmings or clippings, or the same quantity of gutta-percha, and four pounds of sulphur, and mix them thoroughly together. The flower-pot is formed by placing the composition in a metallic mold, $a\ a$, Fig. 2, and subjecting it to pressure by a die or follower, $b\ b$, which presses the soft rubber into the mold $a\ a$, and thereby imparts the desired form to the flow-pot, the plunger $e$ forming the hole in the bottom of the same. The dish or saucer $f$ is formed in a similar manner by molds $g\ g$. The whole is then subjected to heat, while pressed in the molds, of about 260° for one hour.

The composition I have described and the degree of heat to be employed admit of great variations, and I therefore do not limit myself to the proportions named or to the degree of heat to be employed.

It will be obvious that by varying the form of the molds, and that of the dies or followers accordingly, a flower-pot of any desired form or ornamental configuration can be produced.

Having thus described my improvements, what I claim as my invention, and desire to have secured to me by Letters Patent, is—

As a new article of manufacture, a flower-pot formed of india-rubber or gutta-percha, substantially in the manner described.

THOS. J. MAYALL.

Witnesses:
JOSEPH GAVETT,
ALBERT W. BROWN.